(12) United States Patent  (10) Patent No.: US 9,404,526 B2
Huang et al.  (45) Date of Patent: Aug. 2, 2016

(54) ROTARY SUCTION DEVICE

(71) Applicant: Chicony Electronics Co., Ltd., New Taipei (TW)

(72) Inventors: Wei-Cheng Huang, New Taipei (TW); Mei-Yi Tsai, New Taipei (TW); Chun-Yu Huang, New Taipei (TW); Chang-Yi Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 14/657,544

(22) Filed: Mar. 13, 2015

(65) Prior Publication Data

US 2016/0097419 A1  Apr. 7, 2016

(30) Foreign Application Priority Data

Oct. 3, 2014  (TW) .............................. 103134677 A (51) Int. Cl.
  *F16B 47/00*  (2006.01)
  *F16M 13/02*  (2006.01)
(52) U.S. Cl.
  CPC .............. *F16B 47/006* (2013.01); *F16B 47/00* (2013.01); *F16M 13/022* (2013.01)
(58) Field of Classification Search
  CPC ................................................... F16M 13/022
  USPC ................. 248/205.7, 205.5, 206.2, 363, 684
  See application file for complete search history.

(56) References Cited

U.S. PATENT DOCUMENTS

| | | | | |
|---|---|---|---|---|
| 5,104,077 A * | 4/1992 | Liu | ......................... | F16B 47/00 248/205.8 |
| 5,411,230 A * | 5/1995 | Messinger | .......... | F16C 11/0604 248/205.8 |
| 6,607,054 B1 * | 8/2003 | Lindfield | ............... | B65G 47/91 182/113 |
| 7,380,759 B1 * | 6/2008 | Whiteside | ............... | B60R 11/02 248/183.1 |
| 7,475,860 B2 * | 1/2009 | Chien | ..................... | F16B 47/00 248/363 |
| 8,876,072 B2 * | 11/2014 | Hsu | ......................... | F16B 47/00 248/205.5 |
| 2007/0075196 A1 * | 4/2007 | Richter | ................... | F16B 47/00 248/205.8 |
| 2008/0111037 A1 * | 5/2008 | Carnevali | ................ | F16B 47/00 248/206.2 |

* cited by examiner

*Primary Examiner* — Anita M King
(74) *Attorney, Agent, or Firm* — Muncy, Geissler, Olds & Lowe, P.C.

(57) ABSTRACT

The rotary suction device includes a suction disk, a middle cover, and an upper cover. The suction disk includes a base and a soft disk. The base includes a peripheral wall, a guide block, an inclined surface, and a central circular trough. The middle cover includes a central through hole around the peripheral wall and a guide trough. The guide trough is around the guide block, and the middle cover is capable of axial displacement relative to the suction disk. The upper cover includes a central pivot, a sliding block, and an elastic component. The central pivot is accommodated in the central circular trough such that the upper cover is capable of rotating relative to the suction disk. The elastic component is disposed between the upper cover and the suction disk. The sliding block is forced to against the inclined surface by the elastic force of the elastic component.

11 Claims, 9 Drawing Sheets

ROTARY SUCTION DEVICE

CROSS-REFERENCES TO RELATED APPLICATIONS

This non-provisional application claims priority under 35 U.S.C. §119(a) on Patent Application No. 103134677 filed in Taiwan, R.O.C. on 2014 Oct. 3, the entire contents of which are hereby incorporated by reference.

BACKGROUND

1. Technical Field

The instant disclosure relates to a suction device, and more particularly, to a rotary suction device.

2. Related Art

Ordinarily, attaching an object to a surface of another object can be practiced by using a suction disk. Suction disks, for example, can utilized for attaching a hook, a rack or a handle to a surface of a wall, or attaching an event data recorder (EDR) or a navigation device to a dashboard or a windshield of a vehicle. The use of suction disks has lots of advantages such as making no damages to surfaces to which objects attach, having easy assembly process, and having ability to conveniently change attaching locations.

The conventional suction disk device available in the market mainly includes a suction disk, a cover body covering the suction disk, and a handle. The suction disk includes a linking component protruded from the center thereof. The linking component penetrates the cover body and is connected to the handle. In operation, users push the handle toward the suction disk to have the handle been against the cover body, and then pull the center of the suction disk up to have the effect of the attachment between suction disk and the surface of an object.

However, conventional suction disk devices have some issues described below. First, the movement of pushing handles requires enough space according to the size of handles. Therefore, conventional suction disks are usually large and thick, and the operations are complicated. Second, the operation for operating conventional suction disk devices to have the suction disk moved and to produce the effect of attachment requires that a user press the suction disk by one hand, and push the handle by the other hand. The requirement for operating conventional suction disk devices is not convenient for users.

SUMMARY

To address the above issue, the instant disclosure provides a rotary suction device. The rotary suction device includes a suction disk, a middle cover, and an upper cover. The suction disk includes a base and a soft disk connected to the base. The base includes a peripheral wall, a guide block protruding from the peripheral wall, an inclined surface disposed on the peripheral wall, and a central circular trough formed in an inner side of the base.

The middle cover includes a central through hole which is correspondingly around the peripheral wall of the base and a guide trough extending outwardly from the central through hole. The guide trough is correspondingly around the guide block. The middle cover is capable of axial displacement relative to the suction disk.

The upper cover includes a central pivot, a sliding block protruding from the central pivot, and an elastic component. The central pivot is correspondingly accommodated in the central circular trough of the base such that the upper cover is capable of rotating relative to the suction disk. The elastic component is disposed between and is respectively against the upper cover and the suction disk. The sliding block is forced to against the inclined surface by being applied an elastic force from the elastic component.

The effect of attachment of the rotary suction device of the instant disclosure is produced by rotating the upper cover to have the suction disk had an axial displacement relative to the upper cover. Comparing to conventional suction disk devices, the rotary suction device does not require any conventional handle, has simple manufacturing process, and saves the production cost. Further, the rotary suction device of the instant disclosure can be designed as a thinner shape to decrease volume. In addition, users can conveniently practice the operation of the rotary suction device by only one hand.

According to an embodiment, the middle cover can further include a hang-down periphery which corresponds to the soft disk. In other words, the middle cover is a cover body having a concave shape, and the hang-down periphery is the periphery of the middle cover and is located beside the soft disk.

According to an embodiment, the central pivot includes an inner trough which is around the elastic component. An end of the elastic component is against a bottom of the inner trough, which can prevent the elastic component from shifting and can strengthen the connection between the elastic component and the upper cover.

According to an embodiment, the middle cover further includes an arc trough, and the upper cover further includes an extending arm which correspondingly penetrates through the arc trough. The extending arm includes a fastener disposed on the end thereof and slidably fastening the arc trough. Therefore, the upper cover can be assembled to the middle cover, and the upper cover is capable of rotating relative to the middle cover.

According to an embodiment, the peripheral wall of the base further includes an assembly hole which communicates with the inclined surface and is formed in an inner side of the guide block. In the process of assembling, the upper cover can be pressed downwardly, and the elastic component can be correspondingly compressed. The sliding block can be moved into the assembly hole. Then the upper cover can be rotated to have the sliding block moved into the area of the inclined surface. In the meantime, the upper cover is against by the elastic component, which makes the sliding block been against the inclined surface. Such that the upper cover and the suction disk are assembled to each other. Therefore, the rotary suction device of the instant invention does not require any tool in the process of assembling.

According to an embodiment, the upper cover further includes a handle portion. For example, the handle portion can be a convex block disposed on a periphery of the upper cover. The convex block is for conveniently rotating the upper cover.

According to an embodiment, the base includes a plurality of inclined surfaces which are disposed in the peripheral wall and are arranged in an equiangularly spaced relation. The upper cover further includes multiple sliding blocks which protrude from the central pivot and correspond to the inclined surfaces.

According to an embodiment, the base includes multiple guide blocks which protrude from the peripheral wall and are arranged in an equiangularly spaced relation. The middle cover includes multiple guide troughs which correspond to the guide blocks.

According to an embodiment, the base further includes a positioning column disposed in the central circular trough, and the elastic component can be a spring which is around the positioning column in order to strengthen the stability of the elastic component.

The features of the instant disclosure will no doubt become understandable to those of ordinary skill in the art after reading the following detailed description of the embodiments that is illustrated in the various figures and drawings.

DETAILED DESCRIPTION

Referring to FIG. 1 to FIG. 4, an embodiment of the instant disclosure provides a rotary suction device 1 which includes a suction disk 10, a middle cover 20, and an upper cover 30. In the embodiment, the suction disk 10 includes a base 11 and a soft disk 16 connected to the base 11. The soft disk 16 may be composed of soft materials like rubber or silicone. The base 11 may be composed of hard materials like plastic. The base 11 is disposed on the center of a side of the soft disk 16. The soft disk 16 and the base 11 can be manufactured as one piece (e.g., in a manner of in-mold forming).

The base 11 includes a peripheral wall 12, two guide blocks 13 protruding from the peripheral wall 12, two inclined surfaces 14 disposed in the peripheral wall 12, and a central circular trough 15 formed in an inner side of the base 11. In the embodiment, the peripheral wall 12 has a roughly circle shape and surrounds to form the central circular trough 15. The two guide blocks 13 are symmetric and respectively protrude from an outer side of the peripheral wall 12 in a radial manner. The two inclined surfaces 14 respectively belong to surfaces of two sliding troughs 17. The two sliding troughs 17 are disposed in the peripheral wall 12, meaning that the sliding trough 17 penetrates through the peripheral wall 12. The two sliding troughs 17 are arranged in an equiangularly spaced relation, and are respectively connected to the guide blocks 13. The inclined surface 14 belongs to the inner surface of the sliding trough 17 away from the suction disk 1 and is disposed in the peripheral wall 12. In another aspect, the two sliding troughs 17 are, but are not limited to, merely recessed on an inner side of the peripheral wall 12 and do not need to penetrate through the peripheral wall 12.

The middle cover 20 has a concave, circular shape, and includes a central through hole 21. The central through hole 21 of the middle cover 20 is correspondingly around the peripheral wall 12 of the base 11. The middle cover 20 further includes two guide troughs 22 extending outwardly from the central through hole 21. The two guide troughs 22 correspond to and are respectively around the two guide blocks 13. Therefore, the middle cover 20 is capable of axial displacement relative to the suction disk 10, and the middle cover 20 is not rotary relative to the suction disk 10. In the embodiment, the two guide troughs 22 respectively extend from the central through hole 21 in a radial manner. In another aspect, the base 11 can include more than two guide blocks 13, and these guide blocks 13 respectively protrude from the peripheral wall 12 in an equiangularly spaced relation. The middle cover 20 includes a number of guide troughs 22 corresponding to these guide blocks 13. In yet another aspect, the base 11 can merely include one guide block 13, and the middle cover 20 includes, but is not limited to, one guide trough 22 corresponding to the guide block 13. It is to be understood that various numbers of the guide blocks 13 and the guide troughs 22 are covered under the scope of the instant disclosure.

Figure 9A:
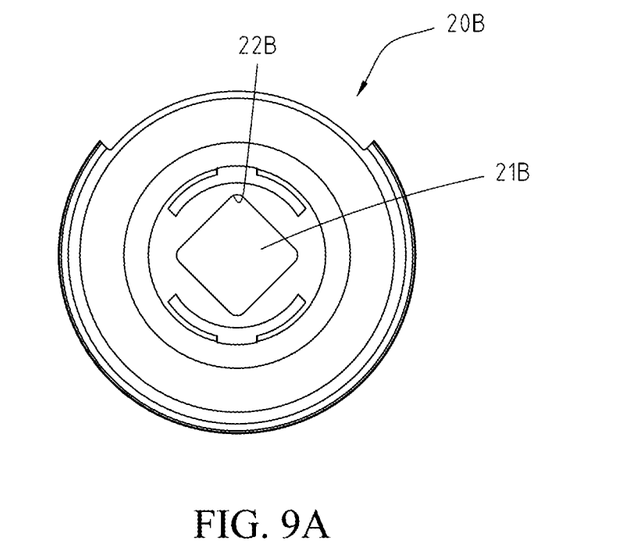
FIG. 9A illustrates a top view of a middle cover according to another embodiment of the instant disclosure.
Figure 9B:
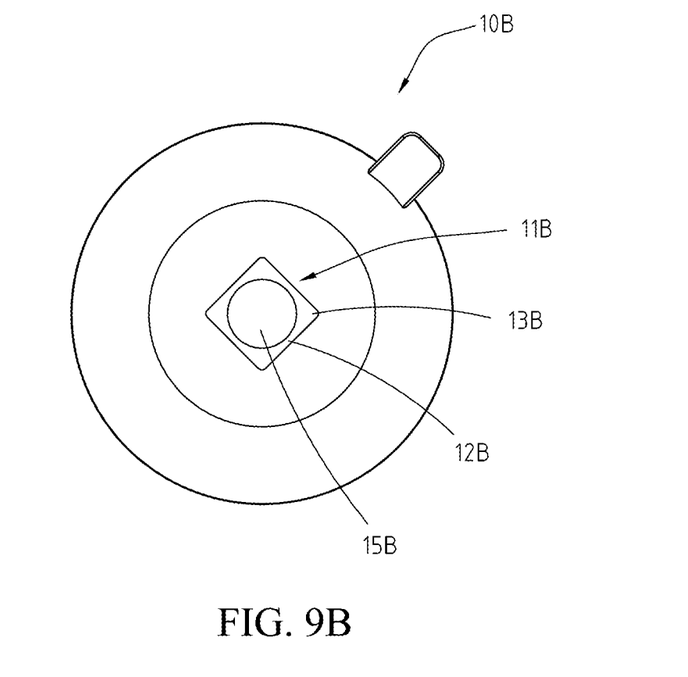
FIG. 9B illustrates a top view of a suction disk according to another embodiment of the instant disclosure.

In addition, referring to FIG. 9A and FIG. 9B, FIG. 9A and FIG. 9B respectively illustrate a middle cover 20B and a suction disk 10B according to another embodiment of the instant disclosure. In the embodiment, the periphery of a base 11B of the suction disk 10B has a rectangular shape. Guide blocks 13B are located at the corners of the base 11B. A peripheral wall 12B of the base 11B surrounds to form a central circular trough 15B. A central through hole 21B of the middle cover 20B has a rectangular shape corresponding to the base 11B. Guide troughs 22B are located at the corners of the central through hole 21B. The central through hole 21B of the middle cover 20B is around the peripheral wall 12B of the base 11B. The guide troughs 22B correspond to and are respectively around the guide blocks 13B of the base 11B. Therefore, the middle cover 20B is capable of axial displacement relative to the suction disk 10B, but the middle cover 20B is not rotary relative to the suction disk 10B. In another aspect, the base 11B and the central through hole 21B may, but are not limited to, have non-circular shapes such as a triangular shape, an octagonal shape, and an irregular shape.

In addition, the middle cover 20 further includes a hang-down periphery 201. In other words, the middle cover 20 is a circular cover body having a concave shape. Namely, the hang-down periphery 201 is the periphery of the middle cover 20. The hang-down periphery 201 is located beside the soft disk 16.

The upper cover 30 has a concave, circular shape, too. The upper cover 30 includes a central pivot 31, two sliding blocks 32 protruding from the central pivot 31, and an elastic component 33. The central pivot 31 is correspondingly accommodated in the central circular trough 15 of the base 11 such that the upper cover 30 is capable of rotating relative to the suction disk 10. In other words, the upper cover 30 is capable of rotating on the axis of the suction disk 10. The elastic component 33 is disposed between and is respectively against the upper cover 30 and the suction disk 10. The two sliding blocks 32 are respectively forced to against the two inclined surfaces 14 by being applied an elastic force from the elastic component 33. In the embodiment, the base 11 of the suction disk 10 further includes a positioning column 151 disposed in the central circular trough 15. The elastic component 33 is a spring which is around the positioning column 151 in order to strengthen the stability of the elastic component 33.

In addition, the peripheral wall 12 of the base 11 further includes two assembly holes 121. The two assembly holes 121 respectively communicate with the two inclined surfaces 14 and are respectively formed in an inner side of the two guide blocks 13. In the process of assembling, the two sliding blocks 32 are first aligned with the two assembly holes 121, and the upper cover 30 is then pressed downwardly. Then the elastic component 33 is correspondingly compressed, and the two sliding blocks 32 are moved into the two assembly holes 121. Then the upper cover 30 is rotated to have the two sliding blocks 32 moved into the area of the two inclined surfaces 14. In the meantime, the upper cover 30 is against by the elastic component 33, which makes the two sliding blocks 32 been against the two inclined surfaces 14. Such that the upper cover 30 and the suction disk 10 are assembled to each other. Therefore, the rotary suction device 1 of the instant invention does not require any tool in the process of assembling, and improves convenience in assembling.

In another aspect, the base 11 can merely include one inclined surface 14, and the upper cover 30 includes one sliding block 32 protruding from the central pivot 31 and corresponding to the inclined surface 14. In yet another aspect, the base 11 can include more than two inclined surfaces 14, these inclined surfaces 14 are disposed in the peripheral wall 12 and are arranged in an equiangularly spaced relation. The upper cover 30 includes a number of sliding blocks 32 protruding from the central pivot 31 and corresponding to these inclined surfaces 14. It is to be understood that various numbers of the inclined surfaces 14 and the sliding blocks 32 are covered under the scope of the instant disclosure.

In addition, the upper cover 30 further includes a handle portion 35. The handle portion 35 is disposed on a side of the upper cover 30 opposite to the suction disk 10. The handle portion 35 is for conveniently rotating the upper cover 30. In the embodiment, the handle portion 35 includes, but is not limited to, two convex blocks 36 disposed on a periphery of the upper cover 30. In another embodiment, the handle portion 35 includes a plurality of convex blocks 36 disposed on and arranged around the periphery of the upper cover 30. In yet another embodiment, the handle portion 35 includes at least an anti-skid structure disposed on the periphery of the upper cover 30. For example, the anti-skid structure can be an anti-skid pad or an anti-skid pattern.

In addition, the central pivot 31 of the upper cover 30 further includes an inner trough 311. The inner trough 311 is around the elastic component 33. An end of the elastic component 33 is against a bottom of the inner trough 311, which can prevent the elastic component 33 from shifting and can strengthen the connection between the elastic component 33 and the upper cover 30.

Furthermore, the middle cover 20 includes two arc troughs 23, and the upper cover 30 includes extending arms 34 corresponding to the arc troughs 23. The extending arms 34 respectively correspondingly penetrate through the arc troughs 23. Each of the extending arms 34 includes a fastener 341 disposed on the end thereof. The fasteners 341 slidably fasten the corresponding arc troughs 23. Thereby, the upper cover 30 can be assembled to the middle cover 20, and the upper cover 30 is capable of rotating relative to the middle cover 20. In the embodiment, the fastener 341 has, but is not limited to, a hook shape.

Figure 1:
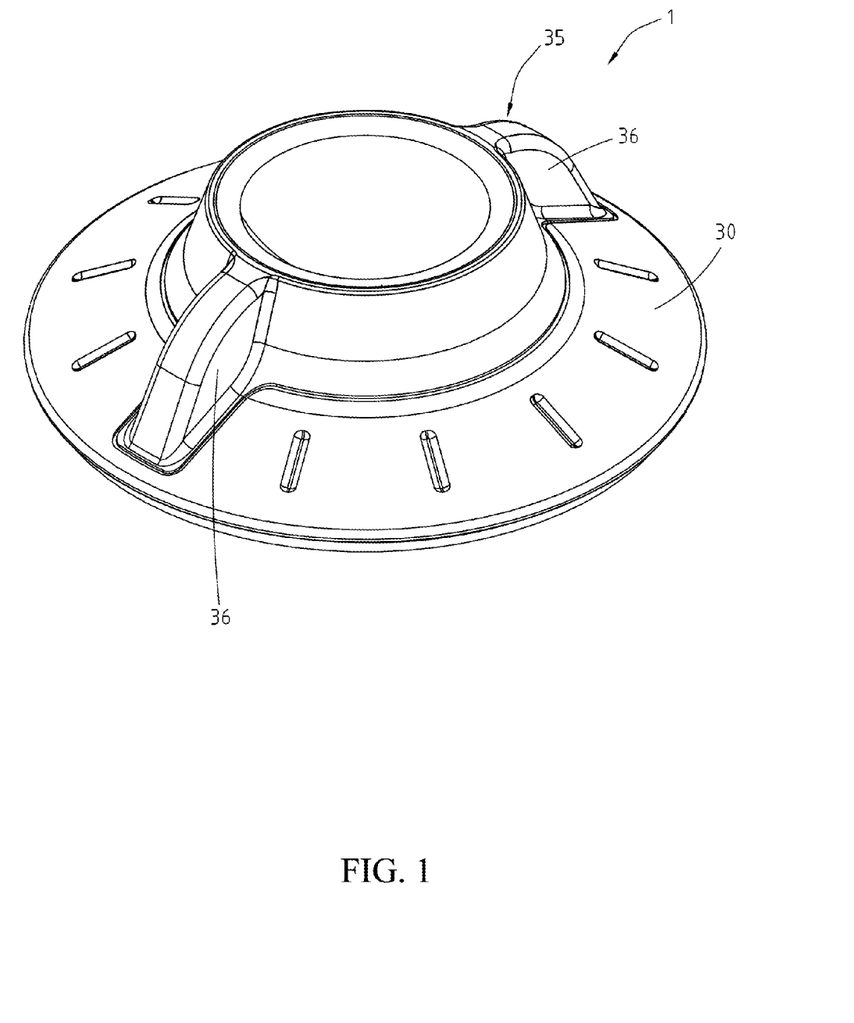
FIG. 1 illustrates a perspective view of a rotary suction device according to an embodiment of the instant disclosure.
Figure 2:
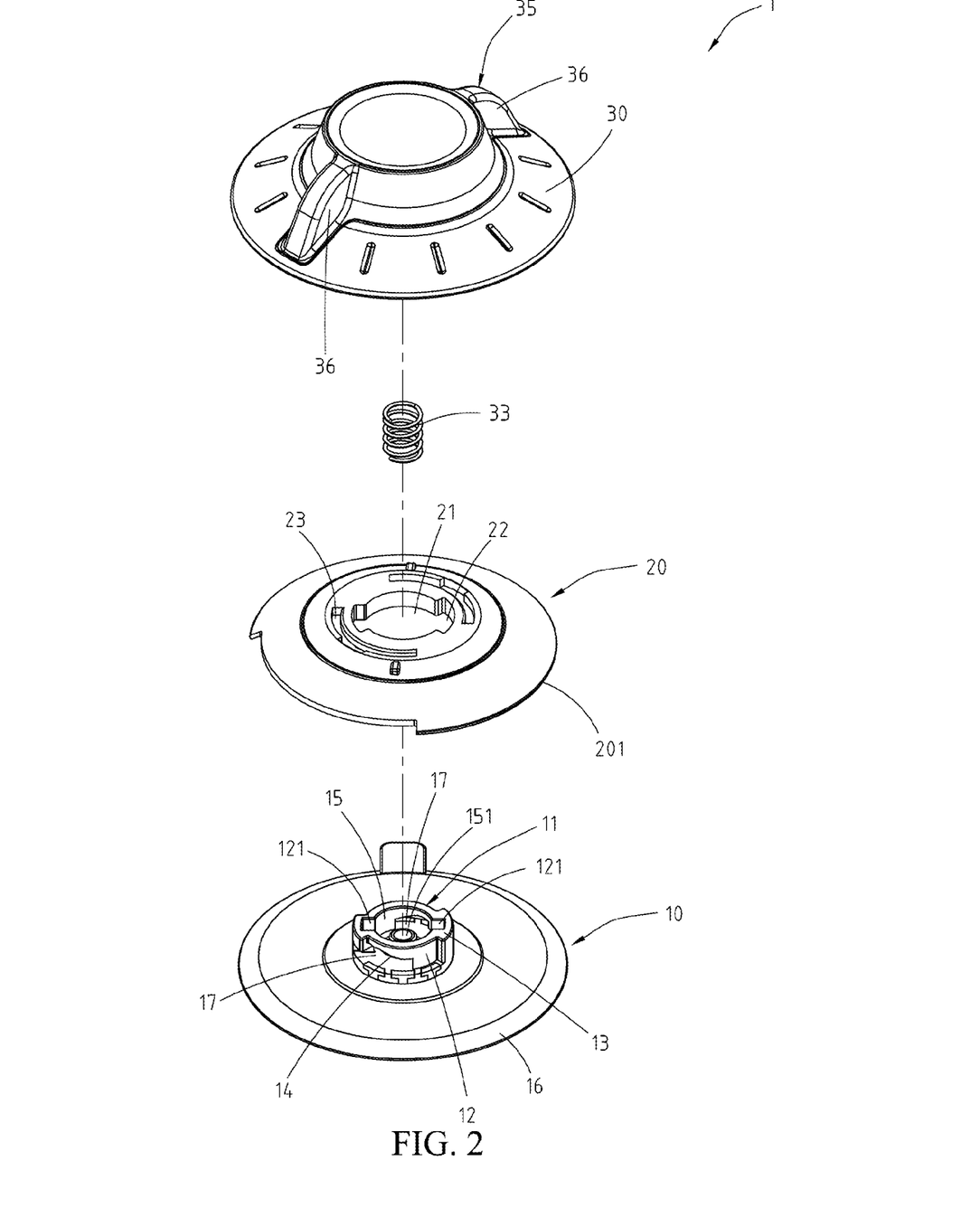
FIG. 2 illustrates an exploded view of the rotary suction device according to the embodiment of the instant disclosure.
Figure 3:
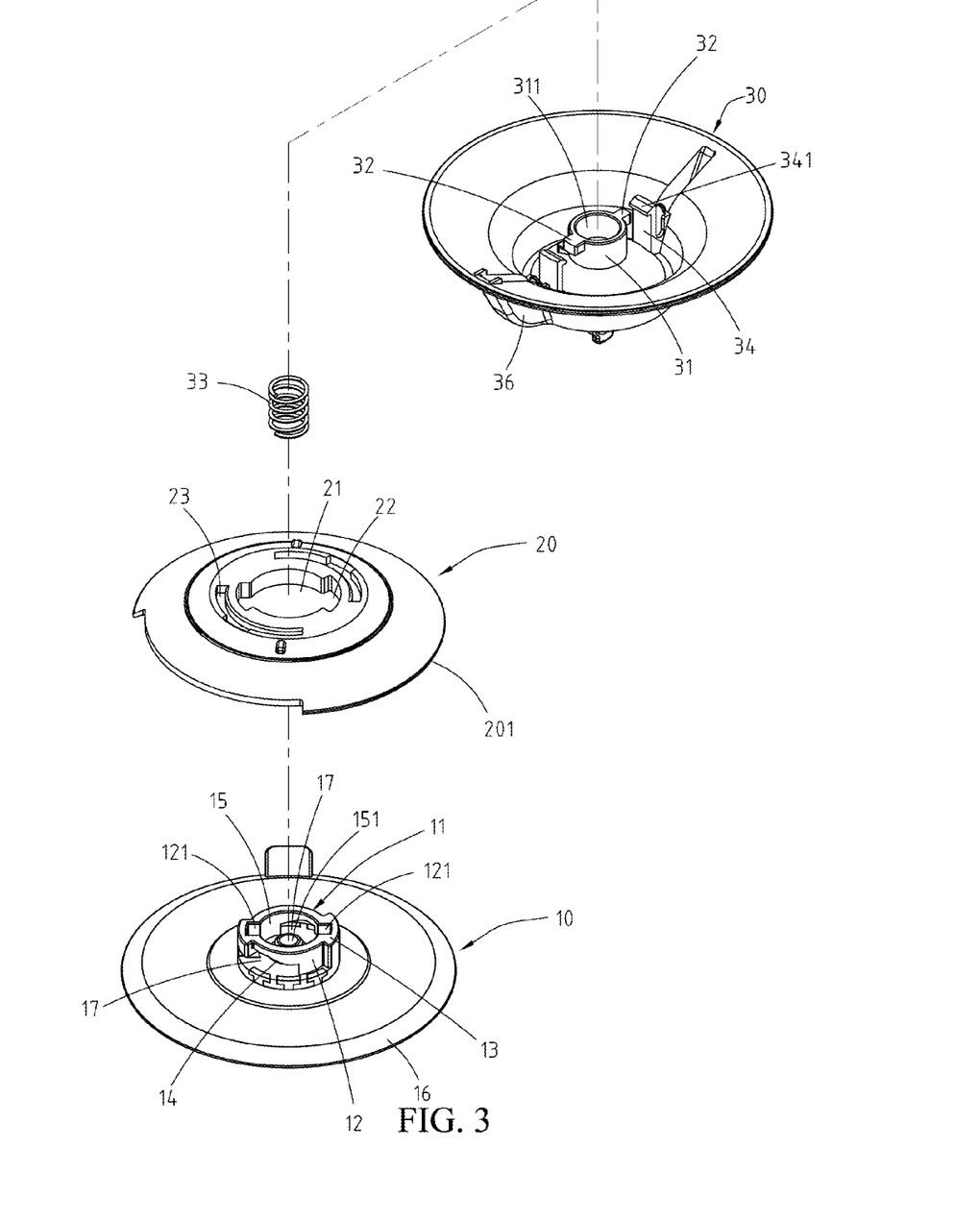
FIG. 3 illustrates another exploded view of the rotary suction device according to the embodiment of the instant disclosure.
Figure 4:
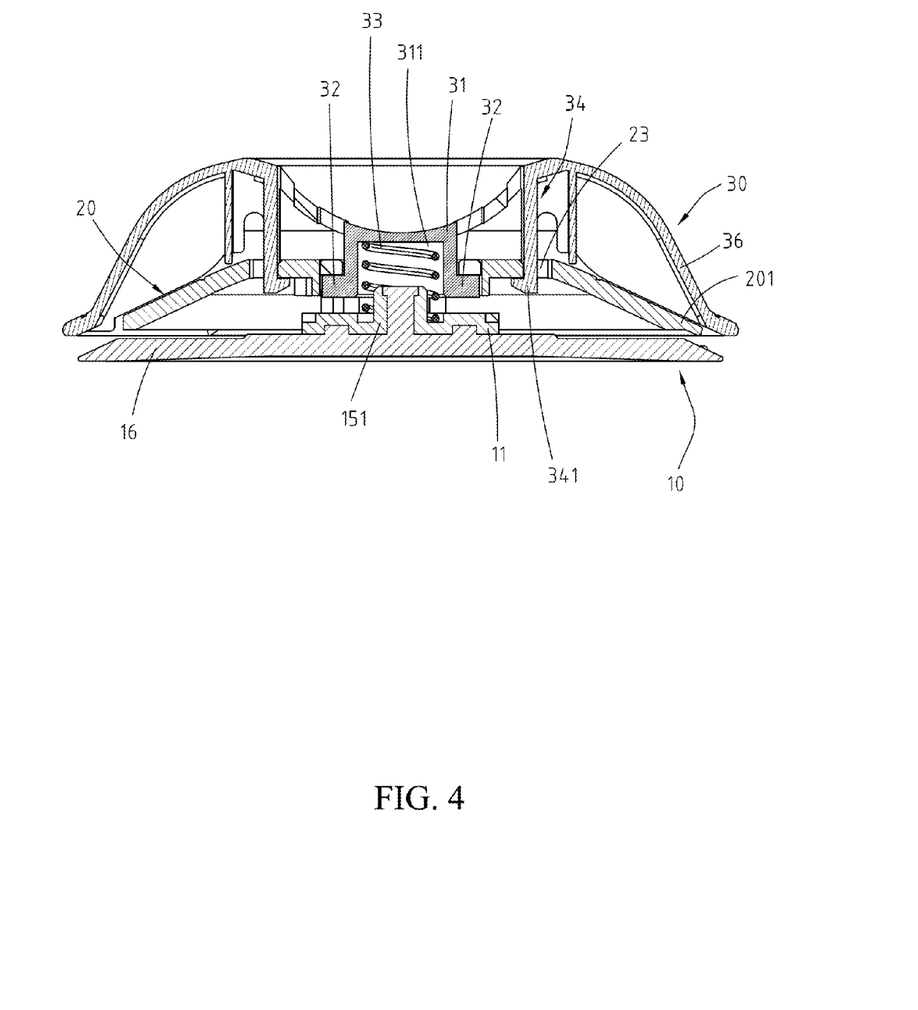
FIG. 4 illustrates a cross-sectional view of the rotary suction device according to the embodiment of the instant disclosure.
Figure 5:
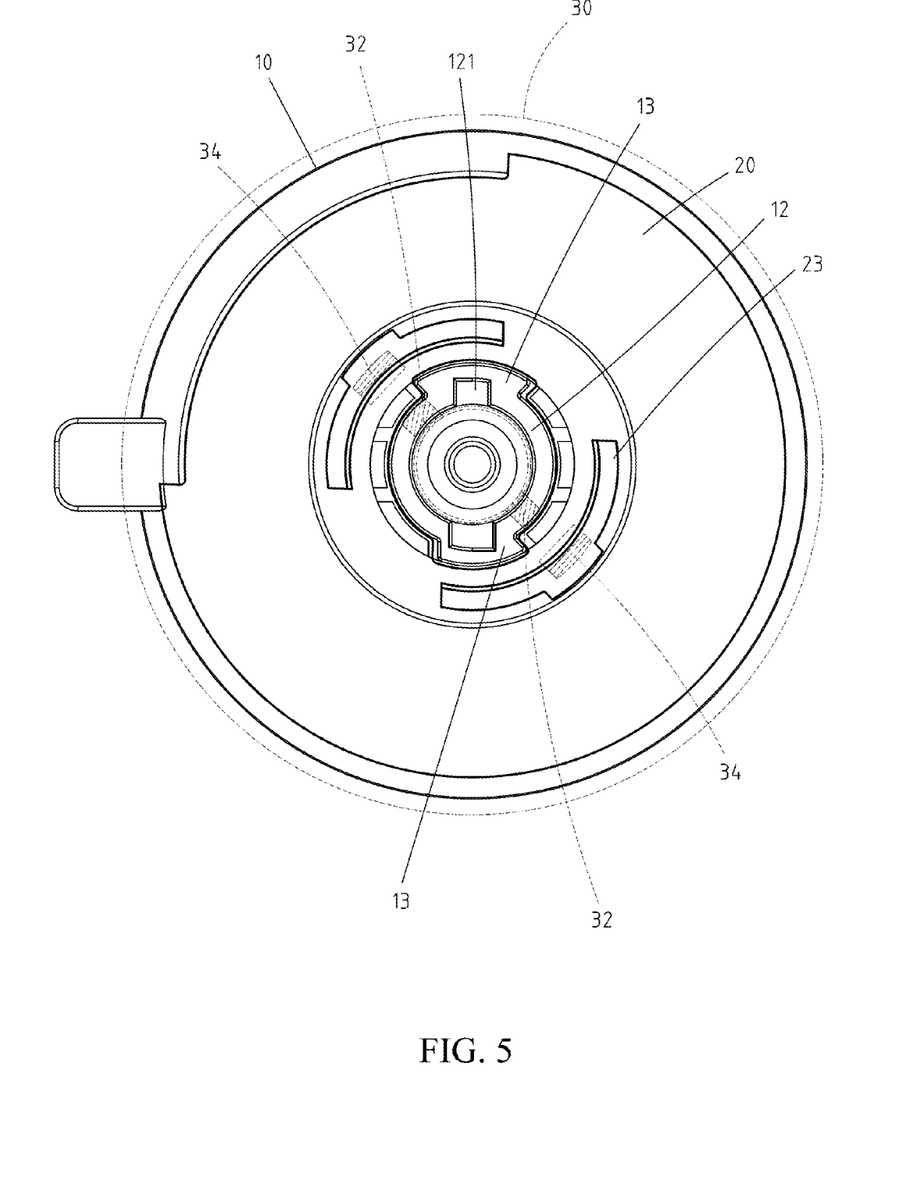
FIG. 5 illustrates a first aspect regarding the operation of the rotary suction device according to the embodiment of the instant disclosure.
Figure 6:
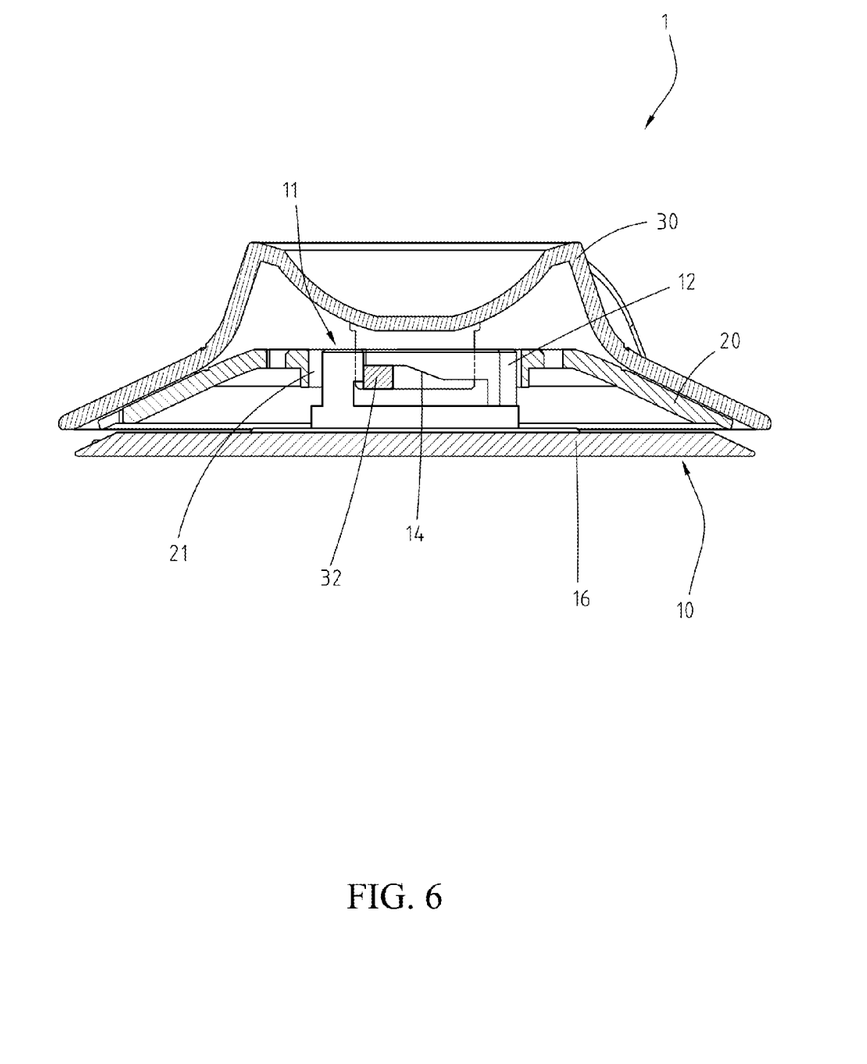
FIG. 6 illustrates a cross-sectional view of FIG. 5.
Figure 7:
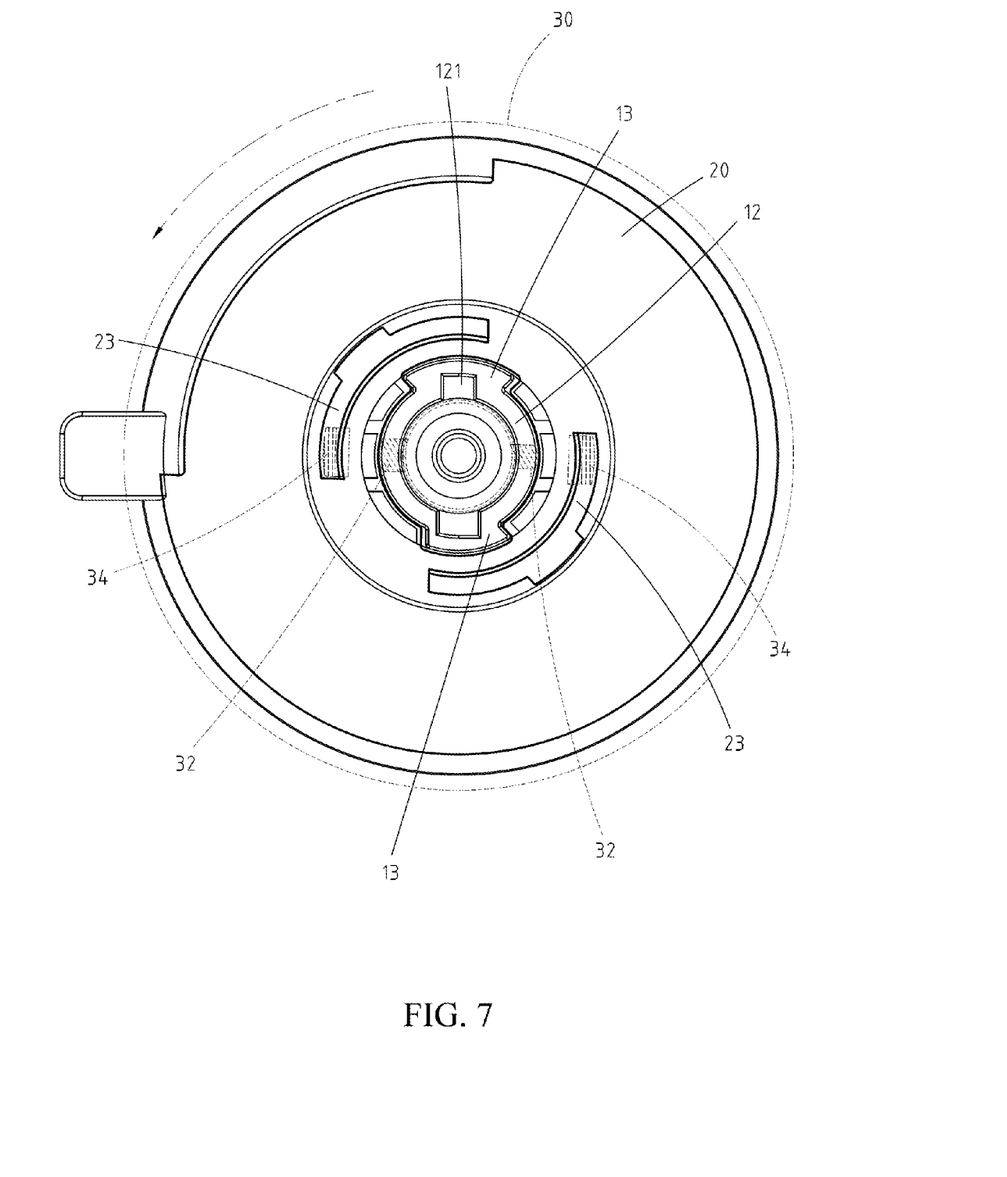
FIG. 7 illustrates a second aspect regarding the operation of the rotary suction device according to the embodiment of the instant disclosure.
Figure 8:
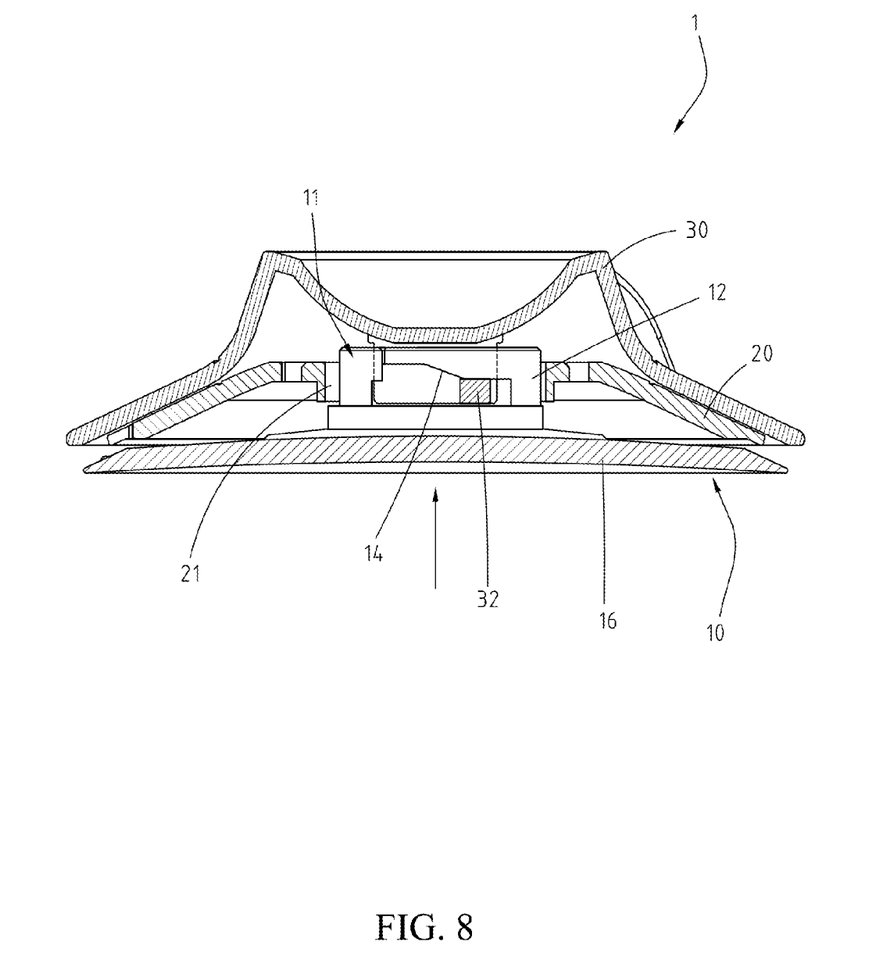
FIG. 8 illustrates a cross-sectional view of FIG. 7.

Referring to FIG. 5 to FIG. 8, the operation of the rotary suction device 1 of the instant disclosure is described as follow:

FIG. 5 and FIG. 6 illustrate the rotary suction device 1 not yet producing the effect of attachment. The upper cover 30 is illustrated by dotted lines in FIG. 5 and FIG. 6 such that the middle cover 20 and the suction disk 10 can be visible. By being applied the elastic force from the elastic component 33, each of the sliding blocks 32 of the upper cover 30 is forced to against a side of the corresponding inclined surface 14 closing to the upper cover 30. When a user needs to use the rotary suction device 1 for attaching it to a surface of an object, the user can press the upper cover 30 by one hand to have the suction disk 10 be against the surface of the object. Then, referring to FIG. 7, the user can rotate the upper cover 30 relative to the suction disk 10 to have each of the sliding blocks 32 of the upper cover 30 moved from one side of the corresponding inclined surface 14 closing to the upper cover 30 to another side closing to the suction disk 10. As shown in FIG. 8, the level of the upper cover 30 is maintained by the elastic component 33 in the rotating process, which has the base 11 and the center of the suction disk 10 moved upwardly and axially to produce a suction force of vacuum between the suction disk 10 and the surface of the object. The suction force of vacuum produces the effect of attachment for attaching the rotary suction device 1 to the object. In other words, the inclined surface 14 is inclined and is capable of urging the base 11 to move axially. The inclined surface 14 has two opposite sides which are respectively a higher side and a lower side. The higher side locates at higher level and closes to the upper cover 30; the lower side locates at lower level and closes to the suction disk 10. When the user rotates the upper cover 30, the sliding blocks 32 moves between the higher side and the lower side to have the base 11 moved axially. By moving the base 11 upwardly or downwardly, the axial displacement of the base 11 produces the effect of attachment or the effect of release.

The effect of attachment of the rotary suction device of the instant disclosure is produced by rotating the upper cover to have the suction disk had an axial displacement relative to the upper cover. Comparing to conventional suction disk devices, the rotary suction device does not require any conventional handle, has simple manufacturing process, and saves the production cost. The upper cover, the middle cover, and the suction disk of the rotary suction device of the instant disclosure can be designed as a flat and circular shape, which is thinner and has less volume. In addition, users can conveniently practice the operation of the rotary suction device by only one hand.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A rotary suction device, comprising:
   a suction disk comprising a base and a soft disk connected to the base, wherein the base comprises a peripheral wall, at least a guide block protruding from the peripheral wall, at least an inclined surface being on the peripheral wall, and a central circular trough being in an inner side of the base;
   a middle cover comprising a central through hole being correspondingly around the peripheral wall and at least a guide trough extending outwardly from the central through hole, wherein the at least a guide trough is correspondingly around the at least a guide block, and the middle cover is capable of axial displacement relative to the suction disk; and
   an upper cover comprising a central pivot, at least a sliding block protruding from the central pivot, and an elastic component, wherein the central pivot is correspondingly accommodated in the central circular trough, the upper cover is capable of rotating relative to the suction disk, the elastic component is between and is respectively against the upper cover and the suction disk, and the at least a sliding block is forced to against the at least an inclined surface by being applied an elastic force from the elastic component.

2. The rotary suction device of claim 1, wherein the middle cover further comprises a hang-down periphery corresponding to the soft disk.

3. The rotary suction device of claim 1, wherein the central pivot comprises an inner trough being around the elastic component, and an end of the elastic component is against a bottom of the inner trough.

4. The rotary suction device of claim 1, wherein the middle cover further comprises an arc trough, the upper cover further comprises an extending arm correspondingly penetrating through the arc trough, and the extending arm comprises a fastener being on the end of the extending arm and slidably fastening the arc trough.

5. The rotary suction device of claim 1, wherein the peripheral wall of the base further comprises at least an assembly hole communicating with the at least an inclined surface.

6. The rotary suction device of claim 5, wherein the at least an assembly hole is formed in an inner side of the at least a guide block.

7. The rotary suction device of claim 1, wherein the upper cover further comprises a handle portion utilized for rotating the upper cover.

8. The rotary suction device of claim 7, wherein the handle portion comprises at least a convex block being on a periphery of the upper cover.

9. The rotary suction device of claim 1, wherein the base comprises at least two inclined surfaces arranged in an equiangularly spaced relation, the upper cover further comprises at least two sliding blocks protruding from the central pivot, and the at least two sliding blocks are against the at least two corresponding inclined surfaces.

10. The rotary suction device of claim 1, wherein the base comprises at least two guide blocks arranged in an equiangularly spaced relation, the middle cover comprises at least two guide troughs, and the at least two guide troughs are respectively around the at least two corresponding guide blocks.

11. The rotary suction device of claim 1, wherein the base further comprises a positioning column being in the central circular trough, and the elastic component is a spring being around the positioning column.

* * * * *